United States Patent
Nonaka et al.

(10) Patent No.: US 8,352,771 B2
(45) Date of Patent: *Jan. 8, 2013

(54) NETWORK SYSTEM

(75) Inventors: Naomichi Nonaka, Kawasaki (JP); Kazuhiro Kusama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/423,999

(22) Filed: Mar. 19, 2012

(65) Prior Publication Data

US 2012/0177058 A1    Jul. 12, 2012

Related U.S. Application Data

(63) Continuation of application No. 12/222,280, filed on Aug. 6, 2008, now Pat. No. 8,166,327.

(30) Foreign Application Priority Data

Sep. 27, 2007 (JP) .................................. 2007-250367
Jul. 7, 2008 (JP) .................................. 2008-176452

(51) Int. Cl.
*G06F 1/26* (2006.01)
*G06F 13/00* (2006.01)

(52) U.S. Cl. ........................................ 713/324; 710/316
(58) Field of Classification Search .................. 713/300, 713/310, 320, 323, 324; 710/316
See application file for complete search history.

(56) References Cited

U.S. PATENT DOCUMENTS

| 4,700,348 | A  | 10/1987 | Ise et al. |
| 5,469,427 | A  | 11/1995 | Sato |
| 5,560,023 | A  | 9/1996  | Crump et al. |
| 7,363,524 | B2 | 4/2008  | Watari et al. |
| 2006/0218424 | A1 | 9/2006 | Abramovici et al. |
| 2007/0043963 | A1 | 2/2007 | Cheng et al. |

FOREIGN PATENT DOCUMENTS

JP        7-95132        9/1993

OTHER PUBLICATIONS

Berger, L., : "Generalized Multi-Protocol Label Switching (GMPLS) Signaling Resource Reservation Protocol-Traffic Engineering (RSVP-TE) Extensions", Network Working Group, Standards Track, Jan. 2003, pp. 1-42.

*Primary Examiner* — Paul R Myers
*Assistant Examiner* — Trisha Vu
(74) *Attorney, Agent, or Firm* — Crowell & Moring LLP

(57) ABSTRACT

Power consumption on GMPLS controlled networks can be reduced by cutting power consumption on spare paths that are not normally used. To achieve power consumption reduction, in the path setting process, a path is calculated while taking the power saving capability of each interface into account, and the applicable interface is set to the power-saving state when setting the spare path. When the spare path was set to the operating state, then the power-saving state on the applicable interface was canceled so that interface could operate normally.

5 Claims, 27 Drawing Sheets

FIG. 8

NETWORK TOPOLOGY TABLE

| CONTACT A NODE ID | CONTACT A IF_ID | CONTACT B NODE ID | CONTACT B IF_ID | SWITCHING CAPABILITY | LINK ATTRIBUTE |
|---|---|---|---|---|---|
| 10.0.0.1 | IF-3 | 10.0.0.2 | IF-1 | OPTICAL WAVELENGTH | 10Gbps |
| 10.0.0.1 | IF-2 | 10.0.0.4 | IF-1 | OPTICAL WAVELENGTH | 10Gbps |
| 10.0.0.2 | IF-2 | 10.0.0.3 | IF-1 | OPTICAL WAVELENGTH | 10Gbps |
| 10.0.0.3 | IF-2 | 10.0.0.4 | IF-4 | OPTICAL WAVELENGTH | 10Gbps |

FIG. 9

POWER CONTROL CAPABILITY TABLE

| NODE ID | IF_ID | POWER CONTROL STATES | POWER STATUS ST0 | POWER STATUS ST1 | POWER STATUS ST2 | POWER STATUS ST3 |
|---|---|---|---|---|---|---|
| 10.0.0.1 | IF-1 | 4 | POWER SAVING = 0% RECOVER TIME = 0 ms | POWER SAVING = 5% RECOVER TIME = 10 ms | POWER SAVING = 20% RECOVER TIME = 3 SECONDS | POWER SAVING = 80% RECOVER TIME = 3 MINUTE |
| 10.0.0.1 | IF-2 | SAME AS ABOVE | SAME AS ABOVE | SAME AS ABOVE | SAME AS ABOVE | SAME AS ABOVE |
| 10.0.0.1 | IF-3 | SAME AS ABOVE | SAME AS ABOVE | SAME AS ABOVE | SAME AS ABOVE | SAME AS ABOVE |
| 10.0.0.1 | IF-4 | SAME AS ABOVE | SAME AS ABOVE | SAME AS ABOVE | SAME AS ABOVE | SAME AS ABOVE |
| 10.0.0.2 | IF-1 | SAME AS ABOVE | SAME AS ABOVE | SAME AS ABOVE | SAME AS ABOVE | SAME AS ABOVE |
| 10.0.0.2 | IF-2 | SAME AS ABOVE | SAME AS ABOVE | SAME AS ABOVE | SAME AS ABOVE | SAME AS ABOVE |
| 10.0.0.2 | IF-3 | SAME AS ABOVE | SAME AS ABOVE | SAME AS ABOVE | SAME AS ABOVE | SAME AS ABOVE |
| 10.0.0.2 | IF-4 | SAME AS ABOVE | SAME AS ABOVE | SAME AS ABOVE | SAME AS ABOVE | SAME AS ABOVE |
| 10.0.0.3 | IF-1 | SAME AS ABOVE | SAME AS ABOVE | SAME AS ABOVE | SAME AS ABOVE | SAME AS ABOVE |
| 10.0.0.3 | IF-2 | SAME AS ABOVE | SAME AS ABOVE | SAME AS ABOVE | SAME AS ABOVE | SAME AS ABOVE |
| 10.0.0.3 | IF-3 | SAME AS ABOVE | SAME AS ABOVE | SAME AS ABOVE | SAME AS ABOVE | SAME AS ABOVE |
| 10.0.0.3 | IF-4 | SAME AS ABOVE | SAME AS ABOVE | SAME AS ABOVE | SAME AS ABOVE | SAME AS ABOVE |
| 10.0.0.4 | IF-1 | SAME AS ABOVE | SAME AS ABOVE | SAME AS ABOVE | SAME AS ABOVE | SAME AS ABOVE |
| 10.0.0.4 | IF-2 | SAME AS ABOVE | SAME AS ABOVE | SAME AS ABOVE | SAME AS ABOVE | SAME AS ABOVE |
| 10.0.0.4 | IF-3 | SAME AS ABOVE | SAME AS ABOVE | SAME AS ABOVE | SAME AS ABOVE | SAME AS ABOVE |
| 10.0.0.4 | IF-4 | SAME AS ABOVE | SAME AS ABOVE | SAME AS ABOVE | SAME AS ABOVE | SAME AS ABOVE |

FIG. 10

SWITCH STATE CONTROL TABLE
220   2201        2202         2203

| INPUT IF | OUTPUT IF | IF STATUS |
|----------|-----------|-----------|
| ⋮ | ⋮ | ⋮ |

FIG. 11

IF POWER STATUS CONTROL TABLE
230   2301         2302

| IF_ID | IF POWER STATUS |
|-------|-----------------|
| ⋮ | ⋮ |

FIG. 12

PATH STATE CONTROL TABLE 330

| SESSION ID 3301 | INPUT IF_ID 3302 | INPUT LABEL 3303 | OUTPUT IF_ID 3304 | OUTPUT LABEL 3305 | STATUS 3306 | ALLOWABLE RECOVER TIME 3307 | OTHER ATTRIBUTE VALUES 3308 |
|---|---|---|---|---|---|---|---|
| ...... | ...... | ...... | ...... | ...... | ...... | ...... | ...... |

FIG. 13

SERVICE TYPE DAILY RECOVER TIME CONTROL TABLE 1302

| SERVICE TYPE 1300 | ALLOWABLE RECOVER TIME 1301 |
|---|---|
| DEDICATED LINE | 50 ms |
| VoIP | 50 ms |
| GENERAL INTERNET | 5 MINUTES |
| HIGH QUALITY INTERNET | 5 SECONDS |

PATH CALCULATION PROCESS

FIG. 17

IF POWER STATE CONTROL TABLE FOR GMPLS CONTROL UNIT 30d IN STEP 503

IF POWER STATE CONTROL TABLE 230

| IF_ID | IF POWER STATE |
|---|---|
| IF-1 | ST0 |
| IF-2 | ST0 |
| IF-3 | ST3 |
| IF-4 | ST3 |

SWITCHING STATE CONTROL TABLE FOR GMPLS CONTROL UNIT 30d IN STEP 504

SWITCHING STATE CONTROL TABLE 220

| INPUT IF | OUTPUT IF | IF STATE |
|---|---|---|
| IF-1 | IF-2 | IN-USE |
| IF-2 | IF-1 | IN-USE |
| IF-3 | | NOT-USED |
| IF-4 | | NOT-USED |

IF POWER STATE CONTROL TABLE FOR
GMPLS CONTROL UNIT 30a IN STEP 506

IF POWER STATE CONTROL TABLE
230

| IF_ID | IF POWER STATE |
|---|---|
| IF-1 | ST0 |
| IF-2 | ST0 |
| IF-3 | ST3 |
| IF-4 | ST3 |

SWITCHING STATE CONTROL TABLE FOR
GMPLS CONTROL UNIT 30a IN STEP 507

SWITCHING STATE CONTROL TABLE
220

| INPUT IF | OUTPUT IF | IF STATE |
|---|---|---|
| IF-1 | IF-2 | IN-USE |
| IF-2 | IF-1 | IN-USE |
| IF-3 |  | NOT-USED |
| IF-4 |  | NOT-USED |

IF POWER STATE CONTROL TABLE FOR GMPLS CONTROL UNIT 30d IN STEP 512

IF POWER STATE CONTROL TABLE 230

| IF_ID | IF POWER STATE |
|---|---|
| IF-1 | ST0 |
| IF-2 | ST0 |
| IF-3 | ST3 |
| IF-4 | ST2 |

SWITCHING STATE CONTROL TABLE FOR GMPLS CONTROL UNIT 30d IN STEP 513

SWITCHING STATE CONTROL TABLE 220

| INPUT IF | OUTPUT IF | IF STATE |
|---|---|---|
| IF-1 | IF-2 | IN-USE |
| IF-2 | IF-1 | IN-USE |
| IF-3 |  | NOT-USED |
| IF-4 |  | RESERVED |

IF POWER STATE CONTROL TABLE FOR
GMPLS CONTROL UNIT 30c IN STEP 515

IF POWER STATE CONTROL TABLE
230     2301                2302

| IF_ID | IF POWER STATE |
|-------|----------------|
| IF-1  | ST2            |
| IF-2  | ST2            |
| IF-3  | ST3            |
| IF-4  | ST3            |

FIG. 24

SWITCHING STATE CONTROL TABLE FOR
GMPLS CONTROL UNIT 30c IN STEP 516

SWITCHING STATE CONTROL TABLE
220  2201          2202          2203

| INPUT IF | OUTPUT IF | IF STATE |
|----------|-----------|----------|
| IF-1     |           | RESERVED |
| IF-2     |           | RESERVED |
| IF-3     |           | NOT-USED |
| IF-4     |           | NOT-USED |

FIG. 25

IF POWER STATE CONTROL TABLE FOR
GMPLS CONTROL UNIT 30b IN STEP 518

IF POWER STATE CONTROL TABLE
230

| IF_ID | IF POWER STATE |
|---|---|
| IF-1 | ST2 |
| IF-2 | ST2 |
| IF-3 | ST3 |
| IF-4 | ST3 |

SWITCHING STATE CONTROL TABLE FOR
GMPLS CONTROL UNIT 30b IN STEP 519

SWITCHING STATE CONTROL TABLE
220

| INPUT IF | OUTPUT IF | IF STATE |
|---|---|---|
| IF-1 | | RESERVED |
| IF-2 | | RESERVED |
| IF-3 | | NOT-USED |
| IF-4 | | NOT-USED |

IF POWER STATE CONTROL TABLE FOR
GMPLS CONTROL UNIT 30a IN STEP 521

IF POWER STATE CONTROL TABLE
230

| IF_ID | IF POWER STATE |
|-------|----------------|
| IF-1  | ST0            |
| IF-2  | ST0            |
| IF-3  | ST2            |
| IF-4  | ST3            |

SWITCHING STATE CONTROL TABLE FOR
GMPLS CONTROL UNIT 30a IN STEP 522

SWITCHING STATE CONTROL TABLE
220

| INPUT IF | OUTPUT IF | IF STATE |
|----------|-----------|----------|
| IF-1     | IF-2      | IN-USE   |
| IF-2     | IF-1      | IN-USE   |
| IF-3     |           | RESERVED |
| IF-4     |           | NOT-USED |

IF POWER STATE CONTROL TABLE FOR
GMPLS CONTROL UNIT 30d IN STEP 607

IF POWER STATE CONTROL TABLE
230

| IF_ID | IF POWER STATE |
|---|---|
| IF-1 | ST0 |
| IF-2 | ST0 |
| IF-3 | ST3 |
| IF-4 | ST0 |

SWITCHING STATE CONTROL TABLE FOR
GMPLS CONTROL UNIT 30d IN STEP 608

SWITCHING STATE CONTROL TABLE
220

| INPUT IF | OUTPUT IF | IF STATE |
|---|---|---|
| IF-1 |  | IN-USE |
| IF-2 | IF-4 | IN-USE |
| IF-3 |  | NOT-USED |
| IF-4 | IF-2 | IN-USE |

IF POWER STATE CONTROL TABLE FOR
GMPLS CONTROL UNIT 30c IN STEP 609

IF POWER STATE CONTROL TABLE
230  2301  2302

| IF_ID | IF POWER STATE |
|---|---|
| IF-1 | ST0 |
| IF-2 | ST0 |
| IF-3 | ST3 |
| IF-4 | ST3 |

FIG. 32

SWITCHING STATE CONTROL TABLE FOR
GMPLS CONTROL UNIT 30c IN STEP 610

SWITCHING STATE CONTROL TABLE
220  2201  2202  2203

| INPUT IF | OUTPUT IF | IF STATE |
|---|---|---|
| IF-1 | IF-2 | IN-USE |
| IF-2 | IF-1 | IN-USE |
| IF-3 |  | NOT-USED |
| IF-4 |  | NOT-USED |

FIG. 33

IF POWER STATE CONTROL TABLE FOR
GMPLS CONTROL UNIT 30c IN STEP 611

IF POWER STATE CONTROL TABLE
230    2301          2302

| IF_ID | IF POWER STATE |
|-------|----------------|
| IF-1  | ST0            |
| IF-2  | ST0            |
| IF-3  | ST3            |
| IF-4  | ST3            |

FIG. 34

SWITCHING STATE CONTROL TABLE FOR
GMPLS CONTROL UNIT 30c IN STEP 612

SWITCHING STATE CONTROL TABLE
220   2201      2202       2203

| INPUT IF | OUTPUT IF | IF STATE |
|----------|-----------|----------|
| IF-1     | IF-2      | IN-USE   |
| IF-2     | IF-1      | IN-USE   |
| IF-3     |           | NOT-USED |
| IF-4     |           | NOT-USED |

FIG. 35

IF POWER STATE CONTROL TABLE FOR GMPLS CONTROL UNIT 30a IN STEP 613

IF POWER STATE CONTROL TABLE 230

| IF_ID | IF POWER STATE |
|---|---|
| IF-1 | ST0 |
| IF-2 | ST0 |
| IF-3 | ST0 |
| IF-4 | ST3 |

SWITCHING STATE CONTROL TABLE FOR GMPLS CONTROL UNIT 30a IN STEP 614

SWITCHING STATE CONTROL TABLE 220

| INPUT IF | OUTPUT IF | IF STATE |
|---|---|---|
| IF-1 | IF-3 | IN-USE |
| IF-2 |  | IN-USE |
| IF-3 | IF-1 | IN-USE |
| IF-4 |  | NOT-USED |

IF POWER STATE CONTROL TABLE FOR
GMPLS CONTROL UNIT 30d IN STEP 616

IF POWER STATE CONTROL TABLE
230

| IF_ID | IF POWER STATE |
|---|---|
| IF-1 | ST3 |
| IF-2 | ST0 |
| IF-3 | ST3 |
| IF-4 | ST0 |

SWITCHING STATE CONTROL TABLE FOR
GMPLS CONTROL UNIT 30d IN STEP 617

SWITCHING STATE CONTROL TABLE
220

| INPUT IF | OUTPUT IF | IF STATE |
|---|---|---|
| IF-1 |  | PROBLEM |
| IF-2 | IF-4 | IN-USE |
| IF-3 |  | NOT-USED |
| IF-4 | IF-2 | IN-USE |

IF POWER STATE CONTROL TABLE FOR
GMPLS CONTROL UNIT 30a IN STEP 619

IF POWER STATE CONTROL TABLE
230

| IF_ID | IF POWER STATE |
|---|---|
| IF-1 | ST0 |
| IF-2 | ST3 |
| IF-3 | ST0 |
| IF-4 | ST3 |

SWITCHING STATE CONTROL TABLE FOR
GMPLS CONTROL UNIT 30a IN STEP 620

SWITCHING STATE CONTROL TABLE
220

| INPUT IF | OUTPUT IF | IF STATE |
|---|---|---|
| IF-1 | IF-3 | IN-USE |
| IF-2 |  | PROBLEM |
| IF-3 | IF-1 | IN-USE |
| IF-4 |  | NOT-USED |

2201, 2202, 2203

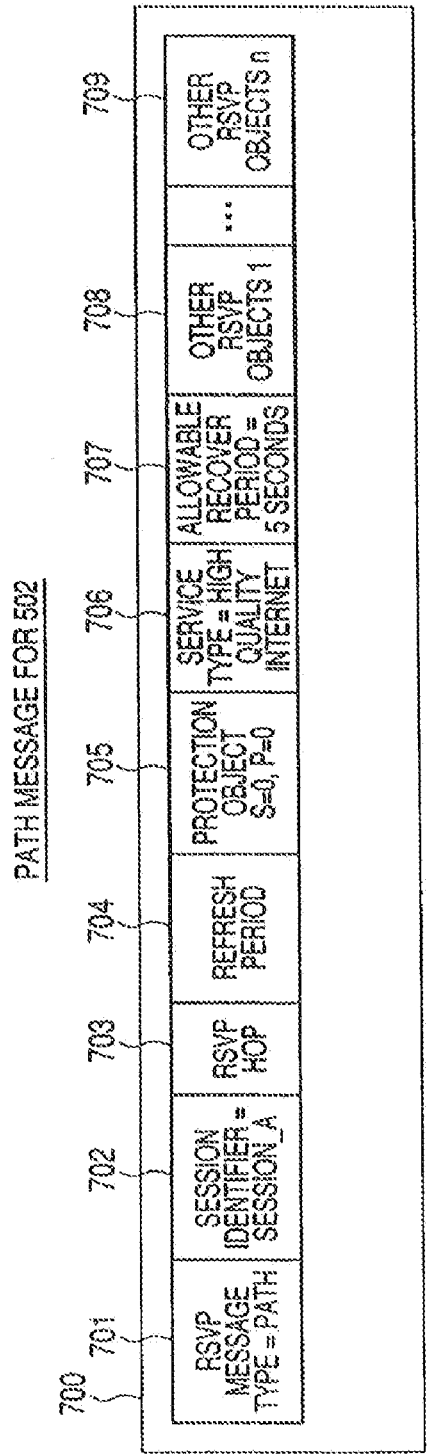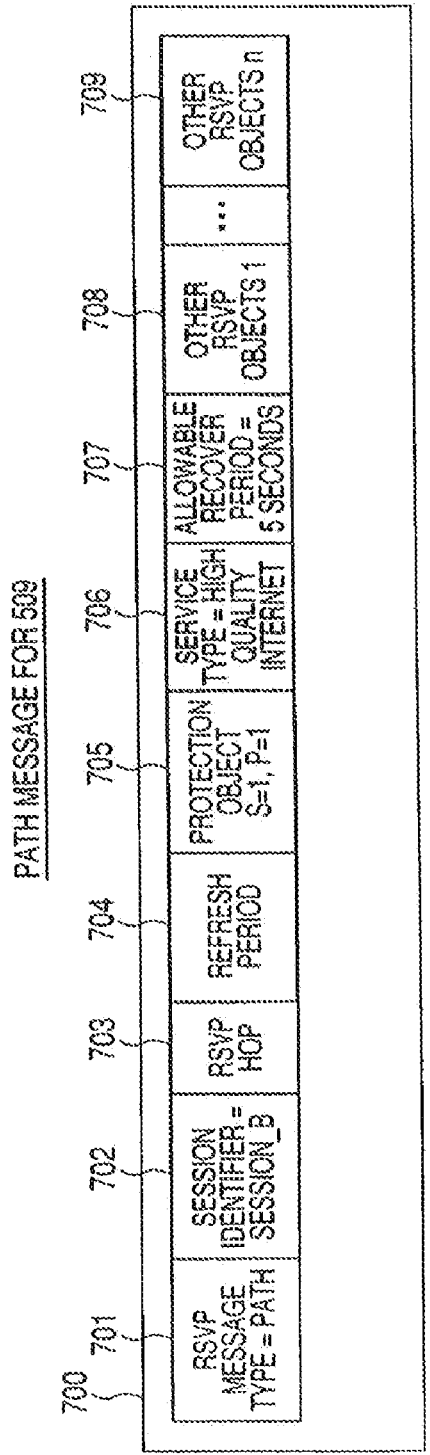

FIG. 43

PATH MESSAGE FOR 601

| 701 | 702 | 703 | 704 | 705 | 706 | 707 | 708 | 709 |
|---|---|---|---|---|---|---|---|---|
| RSVP MESSAGE TYPE = PATH | SESSION IDENTIFIER = SESSION_B | RSVP HOP | REFRESH PERIOD | PROTECTION OBJECT S=0, P=0 | SERVICE TYPE = HIGH QUALITY INTERNET | ALLOWABLE RECOVER PERIOD = 5 SECONDS | OTHER RSVP OBJECTS 1 | ... OTHER RSVP OBJECTS n |

PATH MESSAGE FOR 615

| 701 | 702 | 703 | 704 | 705 | 706 | 707 | 708 | 709 |
|---|---|---|---|---|---|---|---|---|
| RSVP MESSAGE TYPE = PATH | SESSION IDENTIFIER = SESSION_A | RSVP HOP | REFRESH PERIOD | PROTECTION OBJECT S=1, P=1 | SERVICE TYPE = HIGH QUALITY INTERNET | ALLOWABLE RECOVER PERIOD = 5 SECONDS | OTHER RSVP OBJECTS 1 | ... OTHER RSVP OBJECTS n |

700

NETWORK SYSTEM

CLAIM OF PRIORITY

The present application claims priority from Japanese patent application JP 2007-250367 filed on Sep. 27, 2007, and JP 2008-176452 filed on Jul. 7, 2008, the contents of which are hereby incorporated by reference into this application.

FIELD OF THE INVENTION

This invention relates to power control of a spare path for a communication equipment.

BACKGROUND OF THE INVENTION

A communication equipment with a spare path as shown in JP-A No. Hei-7(1995)-95132 can reduce overall power consumption in the equipment by lowering power consumption of the interface board for the spare path.

A method disclosed in RFC3473 describes a method for notifying equipments on whether a current path is in a main path or a spare path by utilizing a GMPLS (generalized multiprotocol label switching) signaling protocol.

SUMMARY OF THE INVENTION

The method disclosed in JP-A No. Hei-7(1995)-95132 describes no technique for deciding to switch from the main path to the spare path and cannot inform other equipments occurrence of a fault in the interface board of one equipment. Therefore, in that method, interface boards which are not directly connected to the fault-occurring equipment could not become lower power consumption status.

The technology disclosed in RFC3473 is capable of giving notification that a current path is in the spare path but contains no information regarding power control of the interface board. Moreover this technology was not able to decide whether to set the interface board for the spare path to the power-saving state.

This invention is capable of lowering power consumption during the standby state by installing power supply controlling unit to turn the power to each component in the optical interface on and off, and by turning the power off to all or a portion of the interfaces that are in a non-operational state.

The GMPLS control unit contains a power control capability table showing the power regulation performance in each interface unit of each optical switch, as well as a network topology table showing the connection status between optical switches. While setting paths for the spare LSP (label switched path), the GMPLS control unit also adds restrictions to the topology so that the path does not use the same nodes as the main LSP, and sets an allowable recovery time as a limiting condition for the service utilizing the LSP, and employs a path with a large power saving effect as the spare path.

When switching to the spare path after a fault occurs on the main path, the GMPLS control unit instructs each GMPLS control unit on the spare path to set the spare path to operating status. Each of these GMPLS control units sets the power supply controlling units for each interface along the spare LSP to normal operating status, and also cuts off alarms issued from the interface units while within the allowable recovery time.

This invention is capable of achieving power saving on the entire network system which sets redundant (main and spare) LSP along multiple equipments LSP, by setting all interface units on the spare LSP to the power-saving state, and, when a fault occurs on the main LSP, setting spare LSP to the normal state by cancelling the power-saving state in all interface units along the spare LSP.

BRIEF DESCRIPTION OF THE DRAWINGS

FIG. 8 is a diagram of the data structure of the network topology table;

FIG. 9 is a drawing showing the data structure for the power control capability table;

FIG. 10 is a drawing showing a switching state control table;

FIG. 11 is a drawing showing the IF power state control table;

FIG. 12 is a drawing showing the data structure of the path state control table 330;

FIG. 13 is a drawing showing the structure of the service type recovery time control table;

FIG. 17 is a drawing showing the IF power state control table for the GMPLS control unit 30d in step 503;

FIG. 18 is a drawing showing the switching state control table for the GMPLS control unit 30d in step 504;

FIG. 19 is a drawing showing the IF power state control table for the GMPLS control unit 30a in step 506;

FIG. 20 is a drawing showing the switching state control table for the GMPLS control unit 30a in step 507;

FIG. 21 is a drawing showing the IF power state control table for the GMPLS control unit 30d in step 512;

FIG. 22 is a drawing showing the switching state control table for the GMPLS control unit 30d in step 513;

FIG. 23 is a drawing showing the IF power state control table for the GMPLS control unit 30c in step 515;

FIG. 24 is a drawing showing the switching state control table for the GMPLS control unit 30c in step 516;

FIG. 25 is a drawing showing the IF power state control table for the GMPLS control unit 30b in step 518;

FIG. 26 is a drawing showing the switching state control table for the GMPLS control unit 30b in step 519;

FIG. 27 is a drawing showing the IF power state control table for the GMPLS control unit 30a in step 521;

FIG. 28 is a drawing showing the switching state control table for the GMPLS control unit 30a in step 522;

FIG. 29 is a drawing showing the IF power state control table for the GMPLS control unit 30d in step 607;

FIG. 30 is a drawing showing the switching state control table for the GMPLS control unit 30d in step 608;

FIG. 31 is a drawing showing the IF power state control table for the GMPLS control unit 30*c* in step 609;

FIG. 32 is a drawing showing the switching state control table for the GMPLS control unit 30*c* in step 610;

FIG. 33 is a drawing showing the IF power state control table for the GMPLS control unit 30*c* in step 611;

FIG. 34 is a drawing showing the switching state control table for the GMPLS control unit 30*c* in step 612;

FIG. 35 is a drawing showing the IF power state control table for the GMPLS control unit 30*a* in step 613;

FIG. 36 is a drawing showing the switching state control table for the GMPLS control unit 30*a* in step 614;

FIG. 37 is a drawing showing the IF power state control table for the GMPLS control unit 30*d* in step 616;

FIG. 38 is a drawing showing the switching state control table for the GMPLS control unit 30*d* in step 617;

FIG. 39 is a drawing showing the IF power state control table for the GMPLS control unit 30*a* in step 619;

FIG. 40 is a drawing showing the switching state control table for the GMPLS control unit 30*a* in step 620;

FIG. 41 is a drawing showing the structure of the PATH message of 502;

FIG. 42 is a drawing showing the structure of the PATH message of 509;

FIG. 43 is a drawing showing the structure of the PATH message of 601;

FIG. 44 is a drawing showing the structure of the PATH message of 615.

DETAILED DESCRIPTION OF THE PREFERRED EMBODIMENTS

The embodiments of this invention are described next.

First Embodiment

Figure 1:
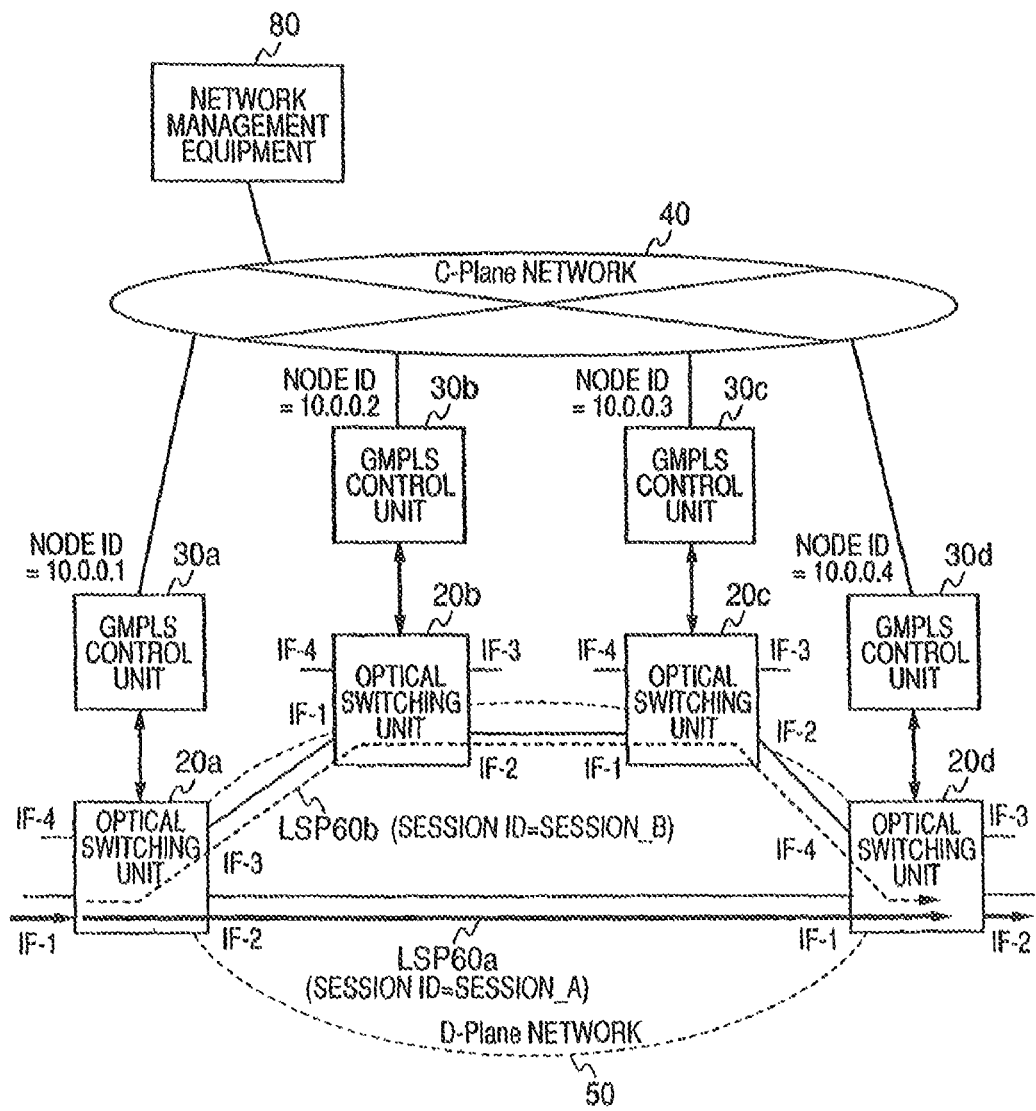
FIG. 1 is a drawing showing the network system of the first embodiment.

The network system of the first embodiment is shown in FIG. 1.

The network system of this invention includes a one or more optical switch units 20, one or more GMPLS control units 30, a C-Plane network 40, a D-Plane network 50, and a network management equipment 80. One or more LSP (Label Switched Paths) 60 are set on the D-Plane network 50. In the figure and the description, a single optical switch unit 20 is paired with a single GMPLS unit 30 to form four sets; however, an optional number of these equipments can be set as required by the network. Moreover, the optical switch unit and the GMPLS control unit need not always be paired one to one, and a structure where one GMPLS control unit 30 controls multiple optical switching units 20 is also applicable to this invention. These optical switching units 20 and GMPLS control units 30 may be mounted in individual cases or may be mounted within the same case.

When all the optical switching units 20 are joined by data lines allowing direct communication on the D-Plane network 50, that state is called adjoining connections. Moreover, if the optical switching units controlled by the GMPLS control unit 30 are adjacently connected, then even if the GMPLS control unit itself is indirectly connected (by a router, etc.) for communication along the C-Plane network 40 and is not joined by a line allowing direct communication, a network structure made up of logical adjacent relations can be structured by utilizing for example tunneling technology.

The present embodiment describes an example utilizing the optical wavelength switching capability as the switching performance. However, this invention can still be applied unchanged even in other switching units using other switching capabilities such as for packets or TDM defined for GMPLS.

An optical switching unit 20 contains one or more optical interfaces 206. The optical switching unit 20 switches data among these optical interfaces 206.

The GMPLS control unit 30 communicates via the C-Plane network 40 based on GMPLS protocols, sets, cancels and changes the LSP60 status. Moreover, GMPLS control unit 30 conveys these settings to the optical switching unit 20 and commands changes in the actual switching state.

The C-Plane network 40 is a packet network using an IP protocol.

The D-Plane network 50 is a set of lines (data lines) joining interfaces for the optical switching unit 20.

The LSP60 is a logical path joining one or more data lines on the D-Plane network 50 and defined as a path from an interface to another interface. Two LSP are specified in FIG. 1. One LSP is the LSP60*a*, which is an LSP via the IF-2 of optical switching unit 20*a* and the IF-1 of optical switching unit 20*d* forming a path from the IF-1 of optical switching unit 20*a* to IF-2 of optical switching unit 20*d*. The other LSP is the LSP60*b* which is an LSP via the IF-1 and IF-2 of optical switching unit 20*b* from IF-3 of optical switching unit 20*a*, IF-1 and IF-2 of optical switching unit 20*c*, and IF-4 of optical switching unit 20*d*.

Figure 2:
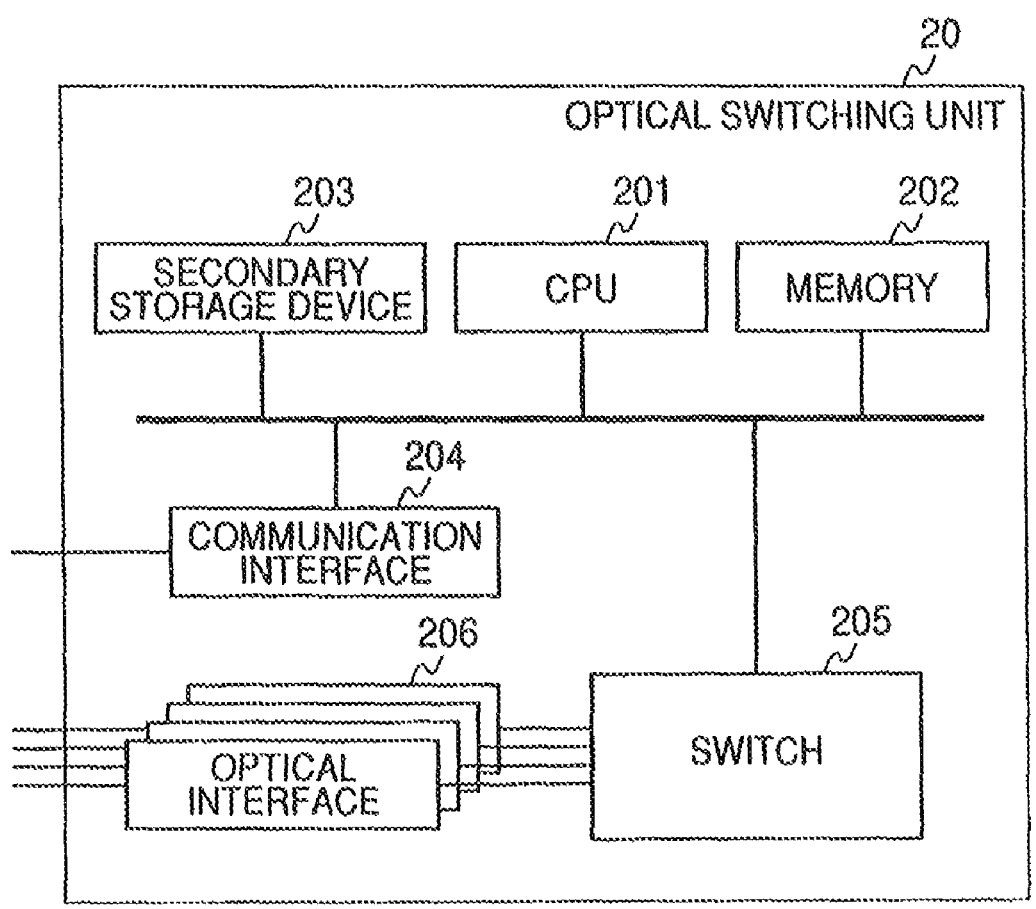
FIG. 2 is a structural drawing of the optical switching unit 20.

The components of optical switching unit 20 are shown in FIG. 2.

The optical switching unit 20 includes a CPU201, a memory 202, a secondary storage device 203, a communication interface 204, a switch 205, and an optical interface 206. The embodiment of this invention can be implemented if the switching unit contains one communication interface 204 but utilizing one or more communication interfaces 204 does not present a problem.

Figure 3:
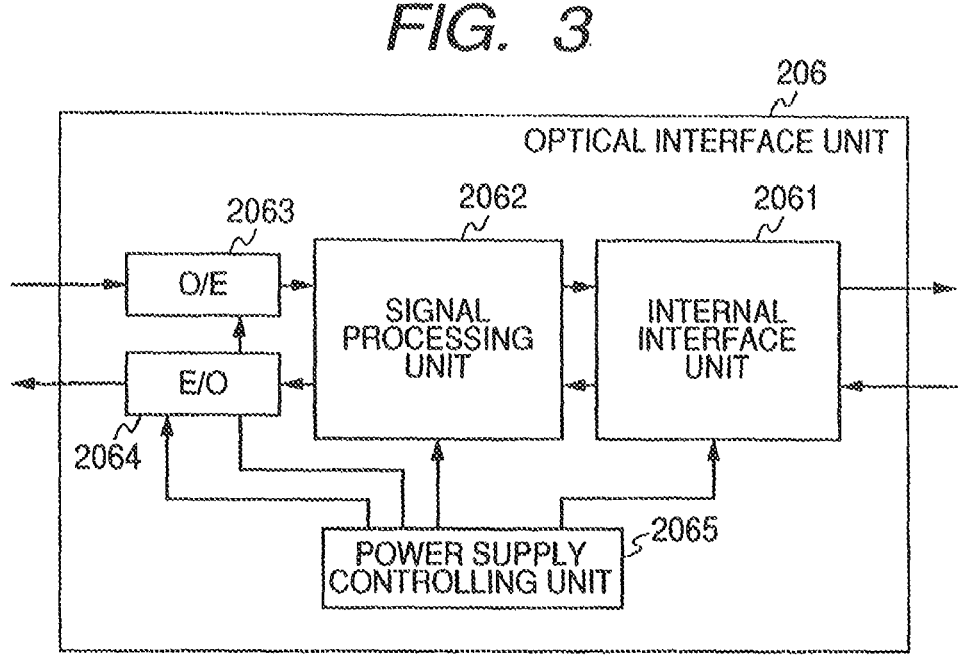
FIG. 3 is a structural drawing of the optical interface unit 206.

FIG. 3 shows sub-components of the optical interface unit 206.

An optical interface unit 206 includes an internal interface unit 2061, a signal processing unit 2062, an O/E converter unit 2063, and E/O converter unit 2064, and a power supply controlling unit 2065.

Figure 4:
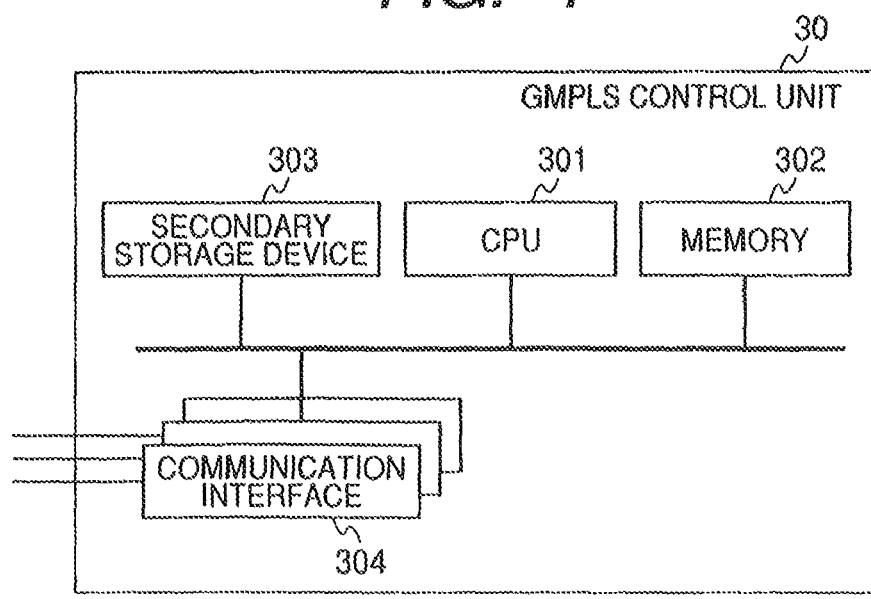
FIG. 4 is a drawing showing the structure of the GMPLS control unit 30.

FIG. 4 shows components the GMPLS control unit 30. The GMPLS control unit 30 is made up of the CPU301, a memory 302, a secondary storage device 203, and one or more communication interfaces 204.

The data structure required to implement this invention is described next.

Figure 7:
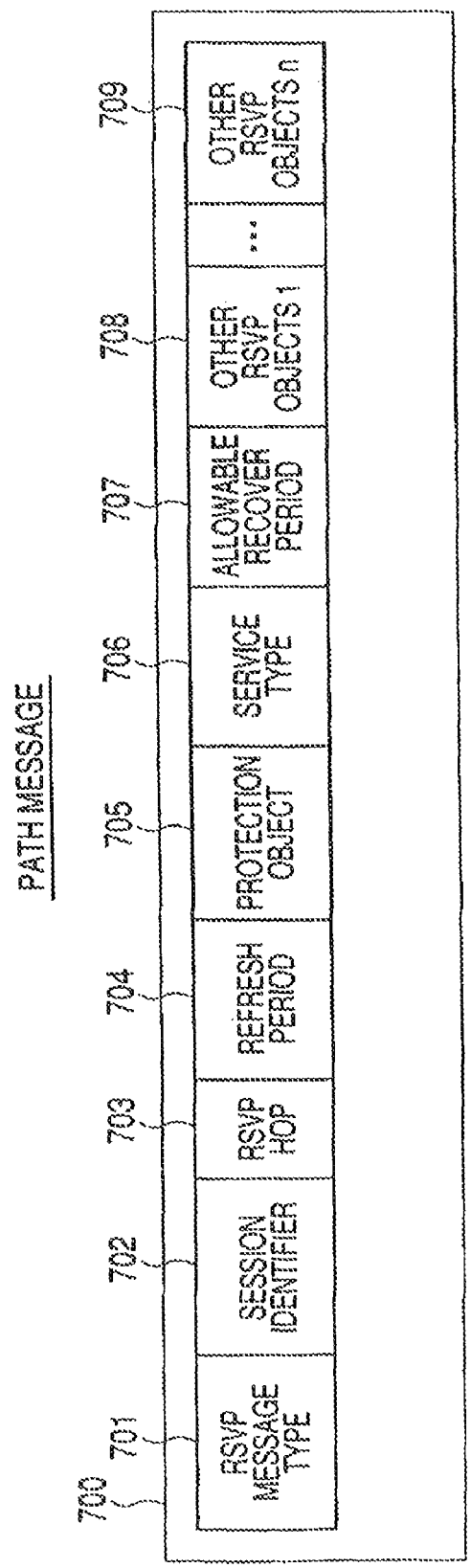
FIG. 7 is a drawing showing the data structure of the path message.

FIG. 7 is a drawing showing the data structure of the PATH message. The PATH message 700 contains an RSVP message type 701, and one or more RSVP objects that are parameters of PATH message 700. The RSVP object includes the required objects such as the session identifier 702, an RSVP hop 703, a refresh period 704, and optional objects. Optional objects include the protection object 705, the service type 706, and the allowable recovery time 707. Other objects are objects 708, 709.

The protection object 705 is specified by RFC3473 and the draft-ietf-ccamp-gmpls-recovery-e2e-signaling-04.txt. The protection object 705 includes a flag showing where the path is the main path or the spare path, and a flag showing whether the spare path is in the operating state or non-operating state.

The service type 706 is an object showing the type of service used on the main path. When a path setting is initiated by signaling from outside this network system, the service type 706 indicates that a service is utilizing the main path.

The allowable recovery time 707 is a parameter showing the upper limit for the time required to shift the spare path from a non-operating state to an operating state.

A description of the RESV message is omitted since this invention does not introduce new parameters.

FIG. 8 is a diagram of the data structure of the network topology table;

The network topology table 800 is stored in the memory 302 of the GMPLS control unit 30, and holds the D-Plane network 50 topology information.

The network topology table 800 includes fields for the endpoint A node ID8001, endpoint A IF_ID8002, endpoint B node ID8003, endpoint B IF_ID8004, switching capability 8005, and the link attribute 8006.

The endpoint A node ID8001, endpoint A IF_ID8002, endpoint B node ID8003 and endpoint B IF_ID8004 are respectively identifiers showing both endpoints of the respective lines. The endpoint A and endpoint B sides do not indicate a particular order or sequence. The endpoint A node ID8001 and the endpoint B node ID8003 are ID for showing the GMPLS control unit 30 for regulating the respective applicable optical switching units 20. The endpoint A node ID8001 and the endpoint B node ID8003 generally utilize an IP address of GMPLS control unit 30. The endpoint A IF_ID8002 and endpoint B IF_ID8004 are each ID numbers for identifying the corresponding optical interface unit 206.

The switching capability 8005 indicates the switching capability for each line for the packet, TDM and optical wavelength.

The link attribute 8006 is a field showing one or more line attributes such as the line speed and transmission delay time.

FIG. 9 is a data structure table for the power control capability table.

The power control capability table 900 is in the memory 302 of GMPLS control unit 30, and contains the fields for node ID9001, IF_ID9002, power control states 9003, power states 9004a-9004c.

The node ID9001 and IF_ID9002 are utilized for identifying the target interfaces. The contents of node ID9001 are identical to endpoint A node ID8001. The contents of IF_ID9002 are identical to the endpoint A IF_ID8002.

The power control states 9003 value indicates the power control states used for the applicable interface. If this value is zero it indicates that power is constantly applied and there is no power control capability for the applicable interface.

The power state 9004 is present as 9004a, 9004b . . . according to the value in the power control states 9003, and shows the power-saving rate in each power state and time for recovery to the normal state.

In this embodiment, the power state is ST0 if power is constantly supplied without power control (or power regulation); the power state is ST1 if the power is off just for the internal interface unit 2061 within optical interface unit 206; the power state is ST2 if the power for the signal processing unit 2062 and the internal interface unit 2061 are off; the power state is ST3 if the power to the O/E converter unit 2063 and the E/O converter unit 2064 is off in addition to the signal processing unit 2062 and the internal interface unit 2061.

The data making up the network topology table 800 and the power control capability table 900 might be changed autonomously within each of the GMPLS control units 30 by using a routing protocol, or might be set in the GMPLS control unit 30 by a management equipment outside this system. The present invention can be implemented in either of these cases.

FIG. 13 is a drawing showing the structure of the service type recovery time control table;

The service type recovery time control table 1300 is inside the memory 302 of GMPLS control unit 30 and contains the respective fields for the service type field 1301 and the allowable recovery time field 1302.

The service type field 1301 is stored as a value matching the service type 706 of PATH message 700. The allowable recovery time field 1302 is stored as a value for the recovery time allowed for the applicable service type.

Typical service types include dedicated lines, VoIP, general Internet, high-quality Internet, etc. Examples of the allowable recovery time for these services are shown in the figure. The figure is only an example and this invention is not limited to the values in the figure.

The service type recovery time control table 1300 value is set based on the operating policy of the administrator of this network system. How this value is determined is beyond the applicable scope of this invention.

FIG. 10 is a drawing showing a switching state control table.

A switching state control table 220 is stored in the memory 202 of the optical switching unit 20, and controls the state of the switching unit 205.

The switching state control table 220 contains respective fields for an input IF field 2201, an output IF field 2202, and an IF state field 2203.

The input IF field 2201 contains IF number for the input side of switch 205. The output IF field 2202 contains IF numbers for the output side of the switch 205. The IF state field 2203 contains the IF state specified by the input IF field 2201.

The IF states are respectively: Not used; In-use; Reserved; and Problem. Here, Not Used indicates that the IF is not being utilized; In-use indicates that the IF is connected to the output IF; Reserved indicates a path has already been set via that IF to serve for example as an auxiliary path during fault recovery but actually is in a state where not connected by the switch 205 to the input IF and output IF. Also, Problem (or fault) indicates that a fault has occurred in the input IF, and data communications cannot be performed.

The output IF field 2202 value is not used and its value is ignored if in a state where the IF state field 2203 value is not in use.

FIG. 11 is a drawing showing the IF power status control table.

The memory 202 of optical switching unit 20 contains the IF power state control table 230. The IF power state control table 230 controls the power state of the optical interface unit 206.

The IF power state control table 230 contains respective fields for an IF_ID field 2301 and an IF power state field 2302.

An ID for the optical interface 206 serving as the object is stored in IF_ID field 2301; and the power state for the applicable interface is stored in the IF power state field 2302. The value for the IF power state field 2302 is specified in the power state 9004 of power control capability table 900.

FIG. 12 is a drawing showing the data structure of the path state control table.

The path state control table 330 is data stored in the memory 302 of GMPLS control unit 30; and stores the path state, that was set using the GMPLS protocol.

The path state control table 330 contains respective fields for a session ID field 3301, an input IF_ID field 3302, and input label field 3303, an output IF_ID filed 3304, an output label field 3305, a state field 3306, an allowable recovery time field 3307, another attribute value field 3308.

The session ID field 3301 stores session ID values utilized for identifying the path on the RSVP-TE protocol.

The input IF_ID field 3302, and input label field 3303, an output IF_ID filed 3304, an output label field 3305 respectively store the input side, and output side IF_ID values, and the label values.

The IF_ID and labels are defined by the GMPLS protocol, and are for intended for abstract and unified handling of switches operated by various transmission methods. In this embodiment, the IF_ID is a numerical value for specifying the optical interface 206 of optical switch 20, and the label is a numerical value for specifying the wavelength of the optical data input and output from the optical interface 206 of optical switch 20. The IF_ID and the label values are numerical values. Each GMPLS control unit 30 sets these independently and notifies the connecting GMPLS control units 30 of these values. The IF_ID and the label values are not related to any physical values (for example, figures expressing the optical wavelength in nanometers, etc.) and only for making decisions on whether values are a match (size of the value is not significant).

In the RSVP-TE, the GMPLS control unit decides the IF_ID value for controlling that interface, and the label value is determined by the downstream side or in other words, the side accepting the data so that the input IF_ID field 3302, and input label field 3303, an output IF_ID field 3304 determine and store their own values; and the value in the output label field 3305 was a value stored after notification from another adjacent connecting downstream GMPLS control unit.

The state field 3306 stores each path state. These path states include the "Operating" and the "Reserved" states.

The path is set in each GMPLS control unit 30 per that operating state. Moreover, even in the optical switching unit 20 the switch 205 is set to the state matching that path setting. During the reserved state on the other hand, that path is set in each GMPLS control unit 30 but the switch 205 of optical switching unit 20 is not yet set to a state.

The allowable recovery time field 3307 stores the value notified by the allowable recovery time 707 of PATH message 700.

The other attribute value field 3308 stores the various types of path information defined by the RSVP-TE. The handling of the other field values is the same as the handling specified in RSVP-TE. There is no need to make a change in the embodiment of this invention so a detailed description is omitted.

A summary of the fault recovery procedure for a D-Plane line fault in the network of FIG. 1 is described next. This embodiment assumes that data communication is implemented on data input from IF-1 of optical switching unit 20a and output from IF-2 of optical switching unit 20d.

The fault recovery methods include a method for searching for a substitute path after a fault occurs and setting the path; and a method for reserving a substitute path in advance, and making a quick recovery by switching the path state after a fault occurs from the reserved state to the operating state. The example in this embodiment employs the latter method that sets a substitute path in advance. Therefore in FIG. 1 two paths are set. One path is LSP60a, which is set as the main path, and the other is LSP60b, which is the spare path. The data usually flows on the LSP60a path, and when a fault occurs on the data line for LSP60a, the switching is changed in each optical switching unit 20 to switch the data communication to the LSP60b, which is the spare path.

Figure 5:
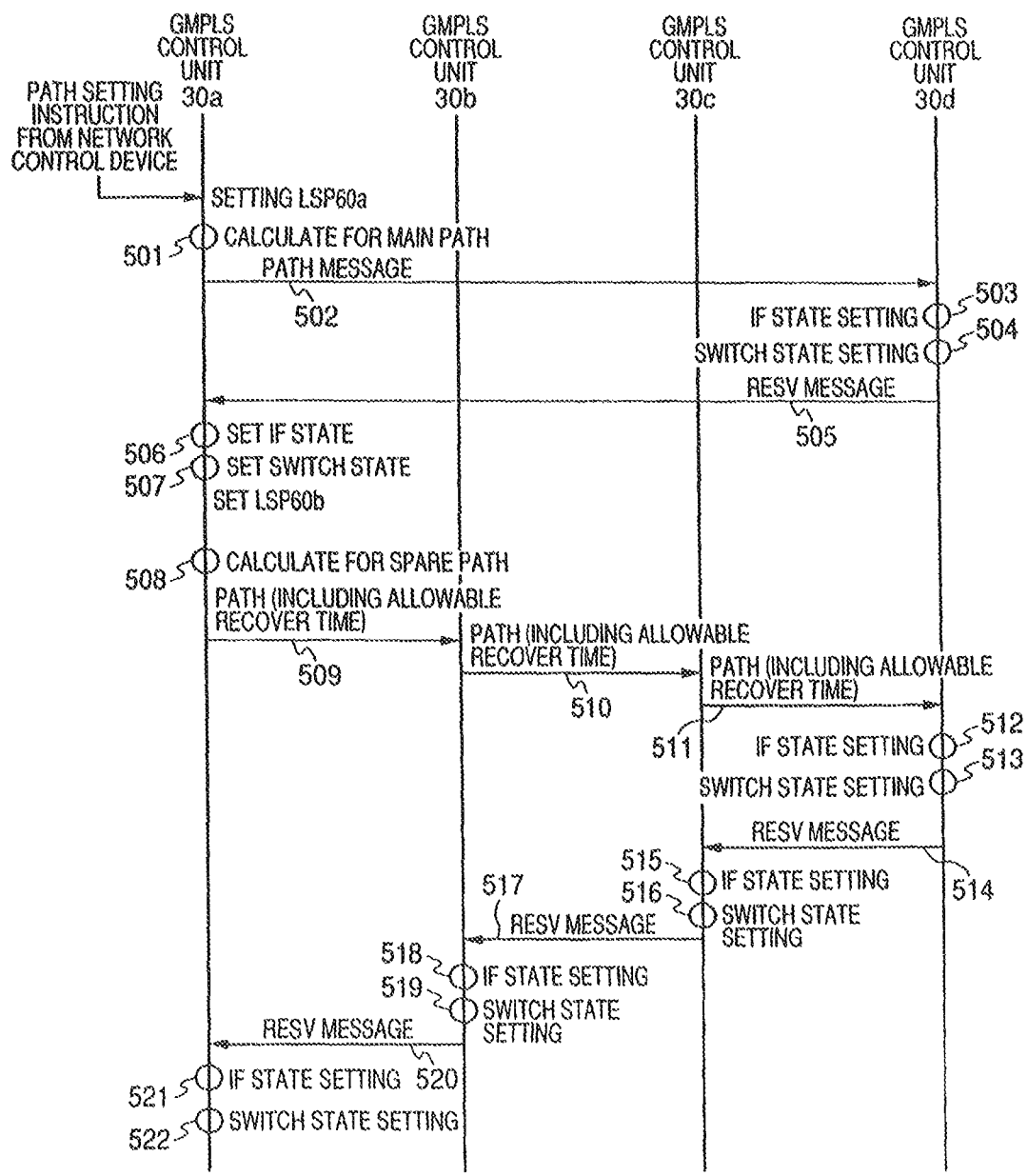
FIG. 5 is a diagram showing the path setting process sequence.

FIG. 5 is a sequence diagram showing the process for setting the spare path and the main path in the first embodiment. The event assumed to initiate the path setting process may be multiple causes such as path setting instructions from a network processor equipment and signaling from an outside network and this invention can be implemented by any of these causes. In the example of this embodiment, the path setting is initiated by instructions from the network management equipment 80.

The GMPLS signaling protocols include multiple protocols such as RSVP-TE and CR-LDP. The present invention can be implemented no matter which of these protocols are employed. The RSVP-TE protocol is utilized as the signaling protocol in the example of this embodiment.

When setting the main path which is LSP60a, first of all, the network management equipment 80 commands the GMPLS control unit 30a controlling the optical switching path unit 20a serving as the path start point, to calculate the main path in 501, and select a path to the optical switching unit 20d as the path endpoint by way of IF-1 of optical switching unit 20d, and IF-2 of optical switching unit 20a serving as the directly connected link.

Next, the GMPLS control unit 30a sends a path message 502 serving as an RSVP-TE message requesting establishment of a path, to the GMPLS control unit 30d controlling the optical switching unit 20d serving as the connecting node and also as the path endpoint node.

FIG. 41 is a drawing showing the structure of the PATH message of 502.

After accepting the path message 502, the GMPLS control unit 30d confirms that the requested path can be set, sets the path requested to optical switching unit 20d in 502, 503, and sends an RESV message 505 which is an RSVP-TE message showing a response to the path set request check to the GMPLS control unit 30a.

FIG. 17 is a drawing showing the IF power state control table for the GMPLS control unit 30d to be set in step 503. FIG. 18 is a drawing showing the switching state control table for the GMPLS control unit 30d to be set in step 504.

When the RESV message 505 is received, the GMPLS control unit 30a sets the main path in the optical switching unit 20a in 506, 507 to complete the setting of the LSP60a.

FIG. 19 is a drawing showing the IF power state control table for the GMPLS control unit 30a to be set in step 506. FIG. 20 is a drawing showing the switching state control table for the GMPLS control unit 30a to be set in step 507.

The process sequence for setting the spare path LSP60 b is shown next. The redundant processing method used during path setting such as setting the spare path is specified as a parameter when starting to set the main path and is therefore outside the scope of the present invention.

The GMPLS control unit 30a calculates the spare path in 504. This spare path is a path using nodes different from the main path. The GMPLS control unit 30a selects a path to the optical switching unit 20d via the optical switching units 20b, and optical switching units 20c as the spare path. The optical switching unit 20a and the optical switching units 20d here are the respective start point and endpoint which is common to both the main path and the spare path but the main path and spare path respectively utilize different interfaces so that redundancy is acquired on the interface level.

The spare path calculation is made based not merely on topology information between the optical switches as described later on but also by taking the power saving capability of interfaces having optical switches into account.

FIG. 42 is a drawing showing the structure of the PATH message of 509.

After calculating the path, the GMPLS control unit 30a sends a PATH message 509 to the GMPLS control unit 30b controlling the optical switching unit 20b serving as the next connecting node. At this time, a parameter (parameter already specified by RSVP-TE) showing that the path is a spare path and currently in the non-operating state is added to the PATH message 509, and a PATH message containing an allowable recovery time as a parameter showing the maximum value for recovery time required for switching the spare path from a non-operating state to an operating state is sent. In the current example, the service type 706 value is High Quality Internet, and the allowable recovery time 707 is 5 seconds.

After confirming that the specified path can be set, the GMPLS control unit 30b sends a PATH message 510 to the GMPLS control unit 30c controlling the optical switching unit 20c serving as the next connecting node. This PATH message 510 also includes the allowable recovery time as a parameter, the same as PATH message 509.

Similarly, after the GMPLS control unit 30c confirms that the specified path setting is possible, it sends a PATH message 511 to the GMPLS control unit 30d controlling the optical switching unit 20d service as the next connecting mode and also as the endpoint node. This PATH message 511 also includes the allowable recovery time as a parameter, the same as PATH message 509.

When the GMPLS control unit 30d that controls the optical switching unit 20d serving as the endpoint node confirms that setting the requested path is possible, it sets the interface power control state used in the spare system in 512 to the state with the highest power-saving rate within the allowable recovery period indicated in PATH message 511, by making switch settings in 513. The joint recovery time in the current example is 5 seconds so ST2 is set as the power state.

FIG. 21 is a drawing showing the IF power state control table for the GMPLS control unit 30d to be set in step 512. FIG. 22 is a drawing showing the switching state control table for the GMPLS control unit 30d to be set in step 513;

The RESV message 514 is in this way sent to the GMPLS control unit 30c and notification sent that path setting is complete.

The GMPLS control unit 30c sets the power state of the spare interface in the same way in 515, sets the switch state in 516, and sends the RESV message 517 to the GMPLS control unit 30b.

FIG. 23 is a drawing showing the IF power state control table for the GMPLS control unit 30c to be set in step 515. FIG. 24 is a drawing showing the switching state control table for the GMPLS control unit 30c to be set in step 516;

The GMPLS control unit 30b next sets the power state of the spare interface in 518, sets the switch state in 519, and sends the RESV message 520 to the GMPLS control unit 30a.

FIG. 25 is a drawing showing the IF power state control table for the GMPLS control unit 30b to be set in step 518. FIG. 26 is a drawing showing the switching state control table for the GMPLS control unit 30b to be set in step 519.

The GMPLS control unit 30a sets the power state of the spare interface in 521, and sets the switch state in 522 to complete the setting of the spare LSP60b.

FIG. 27 is a drawing showing the IF power state control table for the GMPLS control unit 30a to be set in step 521. FIG. 28 is a drawing showing the switching state control table for the GMPLS control unit 30a to be set in step 522.

Figure 6:
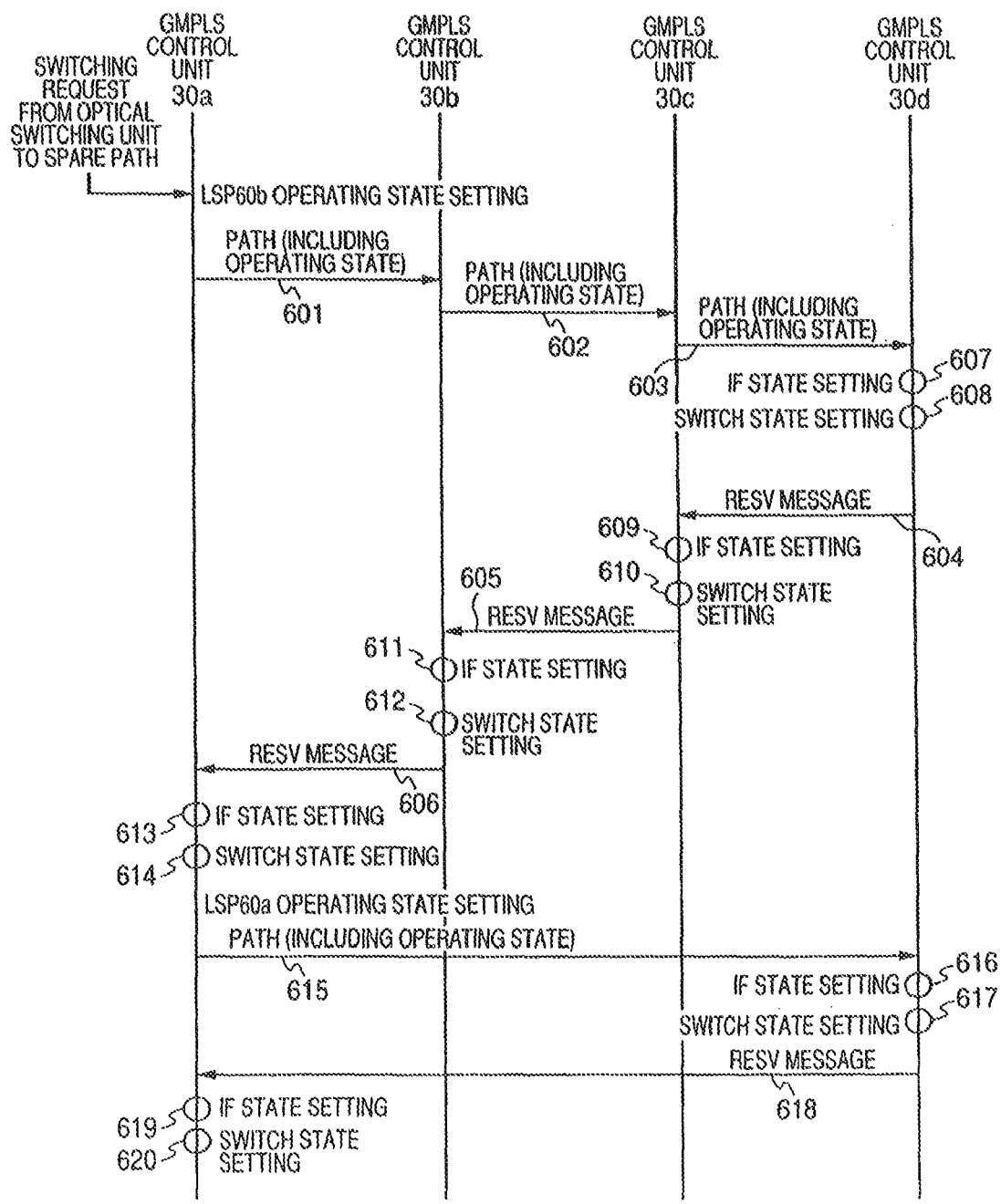
FIG. 6 is a diagram showing the state change processing sequence for the spare path.

FIG. 6 is a process sequence diagram showing the changing of spare LSP60b from a non-operating state to an operating state, and changing the main path LSP60a to a non-operating state.

The process for switching a redundant system utilizing GMPLS is carried out by switching to the spare system by the GMPLS control unit serving as the path start point, sending a PATH message containing the path state change. The method for reporting an abnormality on the main path to the path start point GMPLS control unit is beyond the scope of the GMPLS method and is also outside the scope of this invention which is not dependent on a specific method. The example of the embodiment, shows the case where the process for switching over to the redundant system starts by the optical switching unit 20a sending a switchover request for the spare system path to the GMPLS control unit 30a.

The GMPLS control unit 30a sends a PATH message 601 containing a parameter showing that the path state has been changed from (spare system, non-operating) state to a (spare system, operating) state to the GMPLS control unit 30b. Hereafter, the GMPLS control unit 30b sends the PATH message 602 to the GMPLS control unit 30c, and the GMPLS control unit 30c sends the PATH message 603 to the GMPLS control unit 30d in the same sequence as when setting the path; and completes the changing of the LSP60 from a non-operating state to an operating state by sending the RESV message 604, RESV message 605, RESV message 606 in the reverse direction. In this case, the GMPLS control units 30d-30a set the respective IF power control states to SO0 in 607, 609, 611, and 613, and sets the switching unit 205 state in 608, 610, 612, and 614, And sets the spare LSP60b to the operating state to allow the flow of data.

FIG. 29 is a drawing showing the IF power state control table for the GMPLS control unit 30d to be set in step 607. FIG. 30 is a drawing showing the switching state control table for the GMPLS control unit 30d to be set in step 608. FIG. 31 is a drawing showing the IF power state control table for the GMPLS control unit 30c to be set in step 609. FIG. 32 is a drawing showing the switching state control table for the GMPLS control unit 30c to be set in step 610. FIG. 33 is a drawing showing the IF power state control table for the GMPLS control unit 30c to be set in step 611. FIG. 34 is a drawing showing the switching state control table for the GMPLS control unit 30c to be set in step 612. FIG. 35 is a drawing showing the IF power state control table for the GMPLS control unit 30a to be set in step 613. FIG. 36 is a drawing showing the switching state control table for the GMPLS control unit 30a to be set in step 614. FIG. 43 is a drawing showing the structure of the PATH message of 601.

Next, the GMPLS control unit 30a sends a PATH message 615 containing a parameter showing that the path state has been changed from (main system, operating) state to a (main system, non-operating) state to the GMPLS control unit 30d. The GMPLS control unit 30d sets the power control state of the IF in 616, sets the switching unit 205 state in 617, and sends the RESV message 618 to the GMPLS control unit 30a. The GMPLS control unit 30a changes the main path to the non-operating state by setting the power control state of the IF in 619, sets the state of the switching unit 205 in 620.

FIG. 37 is a drawing showing the IF power state control table for the GMPLS control unit 30d to be set in step 616. FIG. 38 is a drawing showing the switching state control table for the GMPLS control unit 30d to be set in step 617. FIG. 39 is a drawing showing the IF power state control table for the GMPLS control unit 30a to be set in step 619. FIG. 40 is a drawing showing the switching state control table for the GMPLS control unit 30a to be set in step 620. FIG. 44 is a drawing showing the structure of the PATH message of 615.

When setting the IF state in 607, 609, 611, and 613, the alarm showing a communication error from the applicable IF during the allowable recovery period that is reported during path setting is masked, and the warning (alarm) information is temporarily suppressed. Suppressing the alarm in this way separates the alarm that unavoidably occurs during the transition period from a non-operating to an operating state, from an actual equipment alarm, and serves to reduce the load on the administrator.

Figure 14:
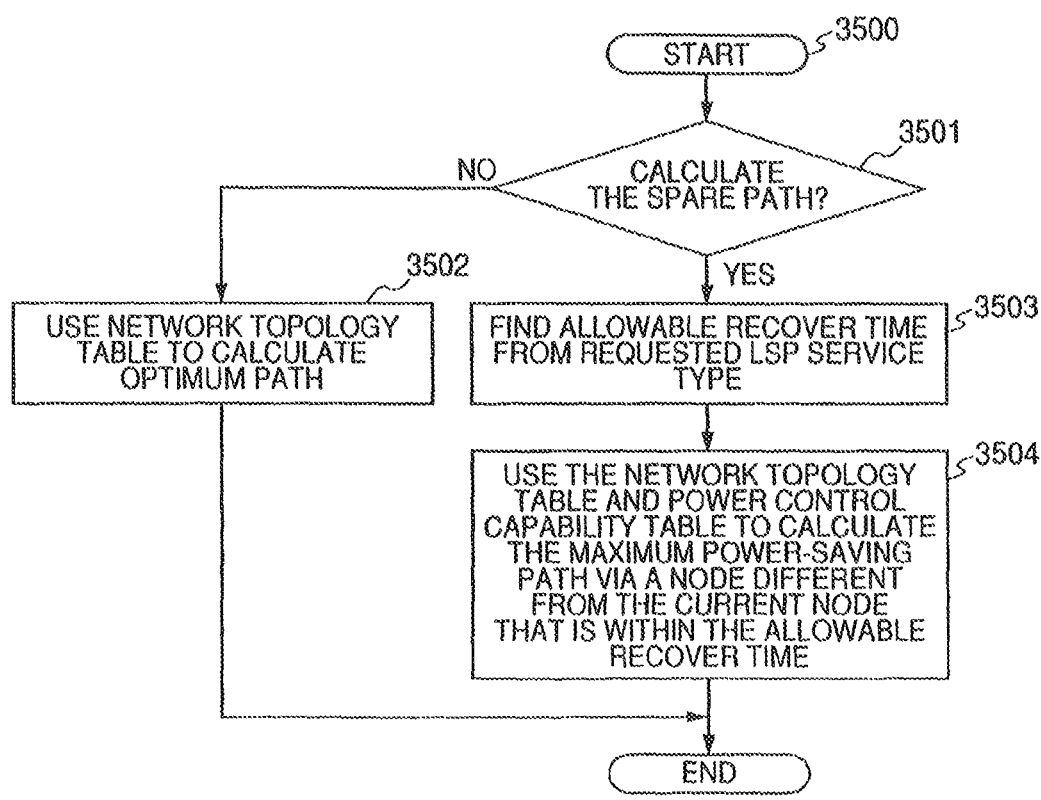
FIG. 14 is a flow chart showing the path calculation process 3500.

FIG. 14 is a flow chart showing path calculation process 3500.

The path calculation process 3500 is a program executed by the CPU 301 of the GMPLS control unit 30.

The path calculation process 3500 is executed via 501 and 508 of FIG. 5.

In the path calculation process 3500 whether to make the spare path calculation is first of all decided in step 3501. Whether or not to calculate the spare path is decided by the value in the protection object 705 in PATH message 700.

In the case of the main path, the process proceeds to step 3502, the network topology table 800 values are checked, and an appropriate path is selected.

If the path is the spare path then the process proceeds to step 3503, the value of the service type 706 of PATH message 700, and the value of the service type recovery time control table 1300 are checked and the value of the allowable recovery time then found.

Next, in step 3504, path information for the main path (previously defined as the RSVP-TE object) and the allowable recovery time are set as limiting conditions, the network topology table 800 and power control capability table 900 are checked, and the path calculated with the condition that the path is the maximum power saving path. The algorithm used for calculating the path under specified limiting conditions, is a well known as GMPLS protocol such as shown for example in RFC2702 and therefore a detailed description is omitted here.

Figure 15:
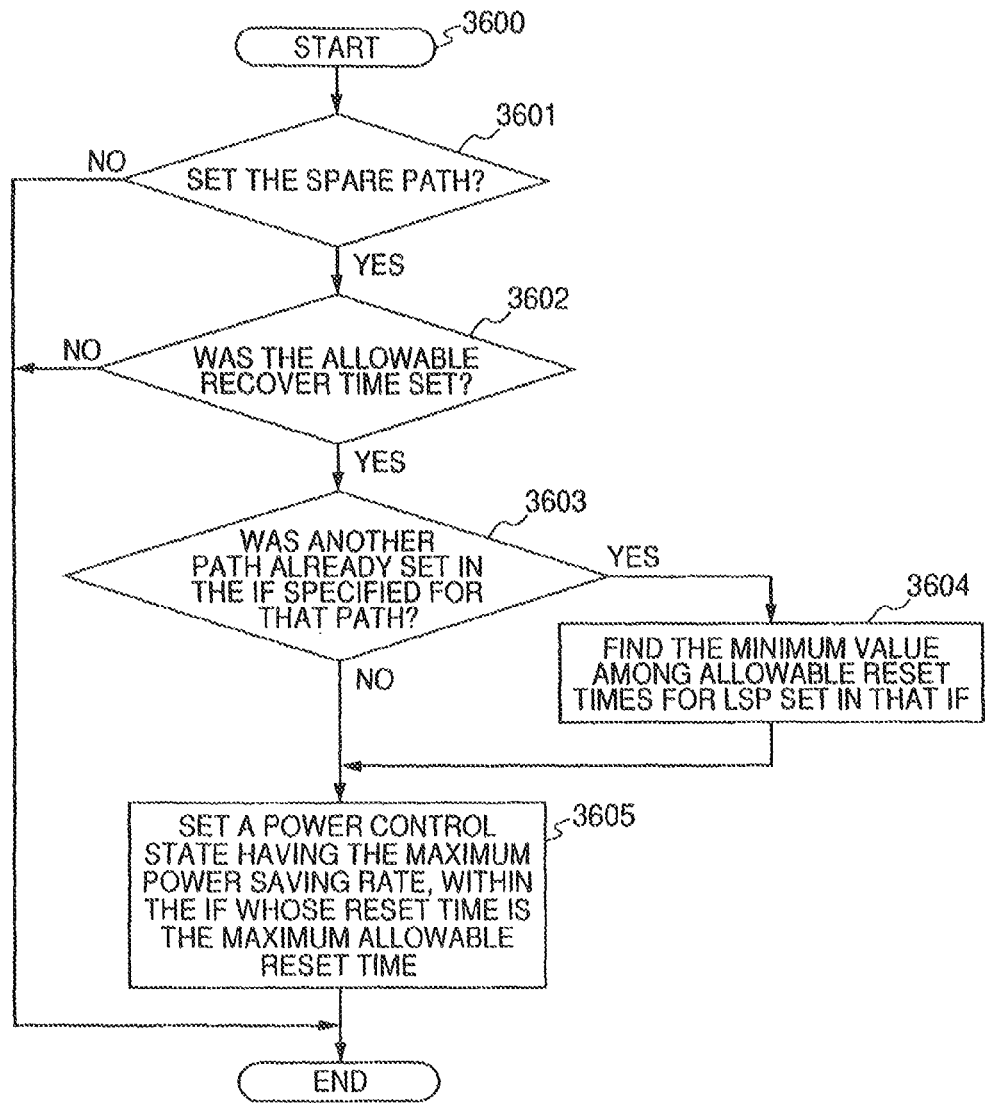
FIG. 15 is a flow chart of the IF state setting process 3600 during the path setting.

FIG. 15 is a flow chart of the IF state setting process 3600 during the path setting.

The IF state setting process 3600 during path setting is a program executed by the CPU 301 of the GMPLS control unit 30.

The IF state setting process 3600 during path setting is executed in 512, 515, 518, and 521 in FIG. 5.

In the IF state setting process 3600 during the path setting a decision is first made on whether the path set in step 3601 is the spare path or not. The decision conditions are the same as in step 3501.

If the path that was set was not the spare path, then no particular power control of the interface is being carried out so the process terminates.

If the spare path was set in step 3601 then the process proceeds to step 3602, the path state control table 330 is checked, and a check made to find whether the allowable recovery time was set for the path. If the allowable recovery time was not set then the process terminates unchanged.

If the allowable recovery time was set, then the path state control table 330 is checked in step 3603, and a check made on whether another spare path has already been set in the IF that must be set. If another path has been set then a minimum value is found from among the allowable setting times that were set in that IF, and that value is then newly set as the allowable setting time in step 3604.

Then in step 3605, the power control capability table 900 is checked, and the power state with the highest power-saving rate is found from among the power states satisfying the specified recovery time that was set, and that value is rewritten into the IF power state control table 230 by sending an instruction to the optical switching unit 20.

The communication protocol used here between the GMPLS control unit 30 and the optical switching unit 20 is outside the applicable range of GMPLS and is a vendor-specific protocol. In many cases, the TL/1 protocol is utilized as this optical switching unit control protocol but other protocols are also applicable to the implementation of this invention.

Figure 16:
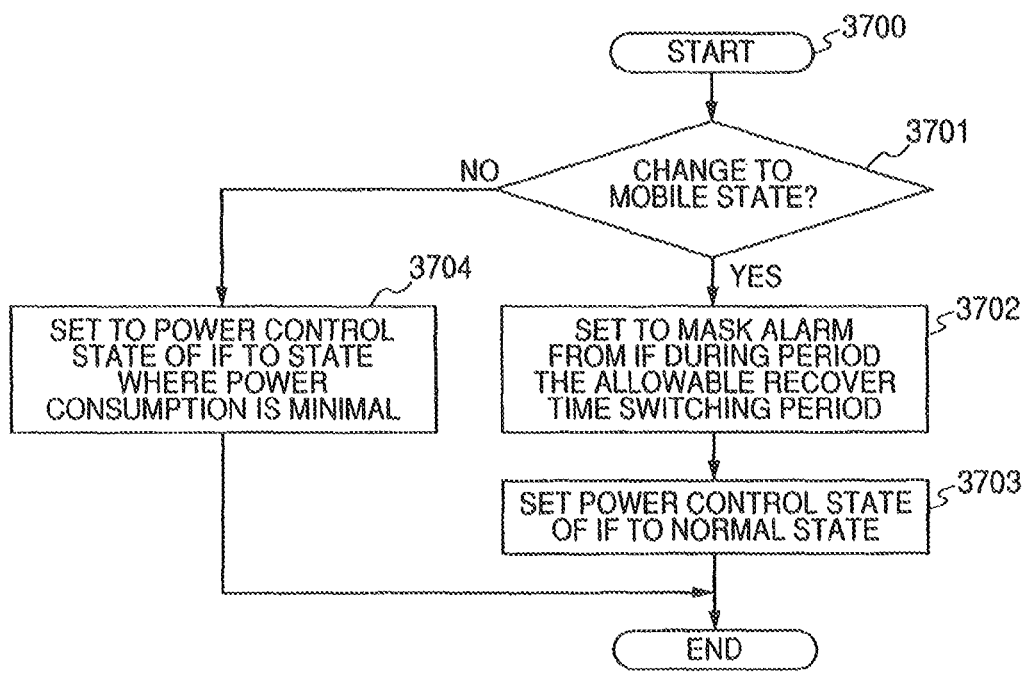
FIG. 16 is a flow chart of the IF state setting process 3700 during changing of the path state.

FIG. 16 is a flow chart of the IF state setting process 3700 during changing of the path state.

The IF state setting process 3700 during path state changing is a program executed by the CPU 301 of GMPLS control unit 30.

The IF state setting process 3700 during path state changing is implemented by 607, 609, 611, 613, 616, and 619 of FIG. 6.

In step 3701 of IF state setting process 3700 during path state changing, a decision is made whether to change the state to the operating state, and if a change to the operating state, then the process proceeds to step 3702. If not a change to the operating state, then the process proceeds to step 3704. In step 3702 the values in the allowable recovery time field 3307 of path state control table 330 are searched, and an instruction sent to the optical switching unit 20 to mask the interface warning (alarm) information when changing the state within the time that was set.

Then in step 3703, the optical switching unit 20 is instructed to set the power control state of the applicable interface to the normal state.

If not changing to the operating state, then in step 3704 the optical switching unit 20 is instructed to set the power control state of the applicable interface to a state where power consumption is small.

The above process is capable of reducing power consumption of the spare path.

This invention is effective on network systems where control is implemented by way of GMPLS protocols. This invention is particularly effective for reducing the power consumption on the redundant path.

What is claimed is:

1. A network system comprising:
a path control unit that sets a main path and a spare path; and
a plurality of data transfer units that transfer data according to instructions from the path control unit;
wherein the main path and the spare path provide paths between a first one of the data transfer units and a second one of the data transfer units,
wherein each of the data transfer units includes an interface for transferring data, and a power control unit for reducing power consumption in the interface in a non-operating state,
wherein the path control unit sets the spare path based on the connection status of at least one of the data transfer units and the power consumption reduction capacity of the at least one of the data transfer units,
wherein one of the power control units sets a respective interface on the spare path to a power-saving state when the spare path is set in the non-operating state, and
wherein the one of the power control units changes the respective interface on the spare path from the power-saving state to a normal state when the spare path is set in an operating state.

2. A network system according to claim 1, wherein the path control unit disregards error information from the respective interface on the spare path for a specified period while the power control unit is changing the respective interface on the spare path from the power-saving state to the normal state.

3. A network system according to claim 1, wherein when setting the spare path, the path control unit notifies other path control units of the allowable recovery time for shifting the respective interface on the spare path from the non-operating state to the operating state, as one portion of the setting information.

4. A network system according to claim 3,
wherein the interfaces contain multiple power saving states with different times required for shifting to respective normal states, and
wherein the path control unit sets the respective interface on the spare path to a power-saving state that can be shifted to the normal state within the shortest allowable recovery time from among the allowable recovery times for all of the interfaces along the spare path, when setting the respective interface on the spare path to a power-saving state.

5. A network system according to claim 1,
wherein the one of the power control units turns power off to all or a portion of the interfaces that are in the non-operating state.

* * * * *